US011778279B2

(12) United States Patent
Olabode

(10) Patent No.: US 11,778,279 B2
(45) Date of Patent: Oct. 3, 2023

(54) SOCIAL MEDIA CROWD-SOURCED DISCUSSIONS

(71) Applicant: Sony Interactive Entertainment Inc., Tokyo (JP)

(72) Inventor: Richard Olabode, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/221,246

(22) Filed: Apr. 2, 2021

(65) Prior Publication Data

US 2022/0321967 A1 Oct. 6, 2022

(51) Int. Cl.
*H04N 21/4788* (2011.01)
*G06N 20/00* (2019.01)
*G06N 5/04* (2023.01)
*H04N 21/25* (2011.01)

(52) U.S. Cl.
CPC .......... *H04N 21/4788* (2013.01); *G06N 5/04* (2013.01); *G06N 20/00* (2019.01); *H04N 21/251* (2013.01)

(58) Field of Classification Search
CPC .. H04N 21/4788; H04N 21/251; G06N 20/00; G06N 5/04
See application file for complete search history.

(56) References Cited

U.S. PATENT DOCUMENTS

| 11,176,484 | B1* | 11/2021 | Dorner | G06F 16/738 |
| 2006/0090137 | A1* | 4/2006 | Cheng | G06Q 10/107 |
| | | | | 715/758 |
| 2012/0303452 | A1* | 11/2012 | Xue | H04L 51/02 |
| | | | | 705/14.49 |
| 2014/0280617 | A1* | 9/2014 | Nilsson | H04L 51/32 |
| | | | | 709/206 |
| 2015/0271553 | A1* | 9/2015 | Pomeroy | H04N 21/42201 |
| | | | | 725/14 |
| 2016/0323650 | A1* | 11/2016 | Grouf | H04N 21/4316 |
| 2017/0171117 | A1* | 6/2017 | Carr | H04L 51/216 |
| 2019/0297039 | A1 | 9/2019 | Rodriguez et al. | |
| 2019/0370556 | A1 | 12/2019 | Kline et al. | |
| 2019/0394153 | A1 | 12/2019 | McGregor, Jr. et al. | |
| 2020/0026755 | A1* | 1/2020 | Hewitt | G06F 40/30 |
| 2020/0106726 | A1 | 4/2020 | Pham | |

OTHER PUBLICATIONS

Intl Search Report PCT/US2022/021827 dated Jun. 15, 2022, 3 pages.

\* cited by examiner

*Primary Examiner* — Chenea Davis
(74) *Attorney, Agent, or Firm* — PENILLA IP, APC

(57) ABSTRACT

Methods and systems for generating social posts for users watching media content include processing inputs provided by one or more users of a group viewing the media content. Mood of each user in the group is predicted based on context of a portion of the media content currently rendering and the inputs of the users. A social post is generated for each user based on the predicted mood of the user. The social post is forwarded for rendering as input from the user.

18 Claims, 8 Drawing Sheets

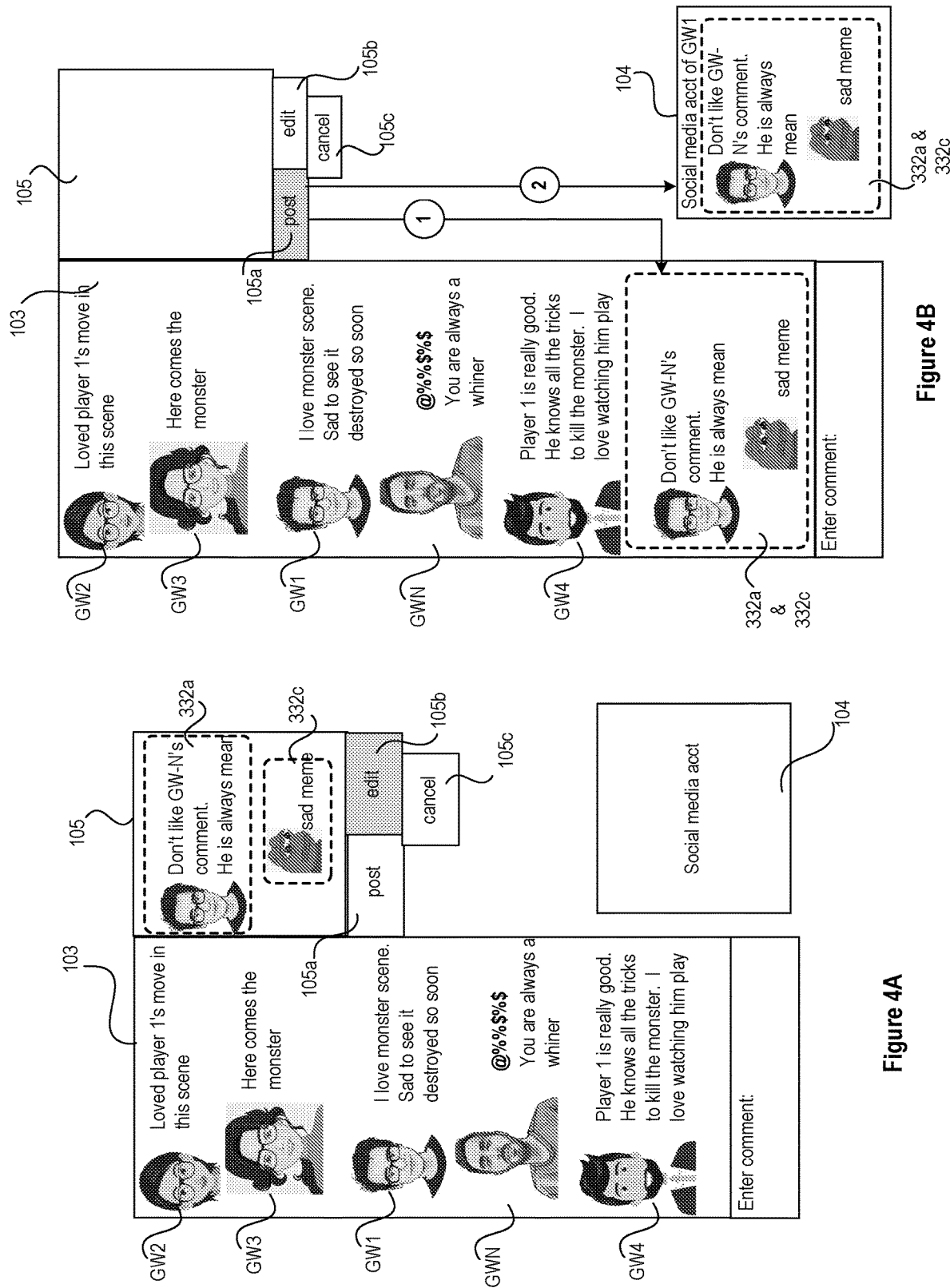

SOCIAL MEDIA CROWD-SOURCED DISCUSSIONS

TECHNICAL FIELD

The present disclosure relates to generating social media content for posting to a social media account for prompting online and offline discussions.

BACKGROUND OF THE DISCLOSURE

Sharing of media content has become mainstream. With the growing popularity of video games, social media applications, and other interactive applications, users are able to share media content generated by the user or are provided by media content providers. In addition to sharing media content, the users are also able to engage in social watching where a group of users can come together to watch media content of an interactive application, such as gameplay of a video game or content of an interactive application, such as a movie, a TV show, etc. The content sharing and social watching can be done from within the confines of the users own space and does not require the users to travel to a common venue. Social watching may include, for example, users choosing (i.e., sign up) to watch gameplay of a particular video game when a popular player is scheduled to play, or users choosing to watch gameplay of a popular video game, or users choosing to watch a movie or TV show, etc. The users may elect to do social watching by sharing a link to the particular video game or to the channel that is streaming the movie or TV show, or may log into a common account (e.g., cloud server, or user account of a player, etc.), to watch the gameplay or the content of the interactive application, such as TV show, movie, video game, etc. The social watching does not have to be for a live show or live gameplay of a video game but can include pre-recorded show or pre-recorded gameplay of a video game or pre-recorded content.

As noted, a plurality of users, as a group, may opt to watch gameplay of a video game or content of an interactive application (i.e., social watching) from their own space. In addition to viewing content of the interactive application rendered on their respective client devices, the users may access an interactive interface, such as a comment box, rendered alongside the content to provide comments related to the content of the interactive application, or comments of another user, or comment on another user. The comments provided through interactive interface are shared with other users in the group, allowing the users to have a truly immersive group watching experience. The comments may be in the form of text comments, audio comments, video content, memes, graphical interchange format files (GIFs), thumbs-up (to indicate like), thumbs-down (to indicate dislike), emojis, emoticons, applause, graphics, etc.

It is in this context that embodiments of the disclosure arise.

SUMMARY

Embodiments of the present disclosure relate to systems and methods for automatically generating comments for users watching media content. The comments are generated to originate from a particular user and may include comments related to the media content, comments provided by another user in a group of users in which the particular user is a part, or comments related to another user. The comments are generated to reflect the mood of the particular user or are based on the mood of the particular user. The various embodiments describe a way to identify users that are watching media content as a group. Inputs provided by one or more users in the group, as the users are watching the media content, are used to predict mood of each user in the group. In addition to the inputs of the one or more users, context of the media content that the users are watching are also used in predicting the mood of each user. The predicted mood of each user is then used to generate social posts for each user. The social post of a user is generated to make it appear as though the social posts originate from that user and this is done by adopting the social interaction style of the user. For instance, the system may refer to posting preferences set by the user or may deduce the posting preferences by analyzing the social interactions of the user either when watching the media content or other content or when interacting in the social media. The posting preferences may identify the interaction style followed by the user when the user generated the social posts that were posted to a comment box rendered alongside the media content or to the social media account of the user. Some of the posting preferences that may be specified by the user or determined from observing the user's social interaction include a general style of interaction, what type of content the user usually respond to, language used, type of interaction typically provided by the user (e.g., textual, memes, emojis, etc.), tone of comment, frequency of comment, etc. The system adopts the interaction style of the user when generating the social post for the user.

As the context of the media content changes over time and as additional inputs are received from the users as the users are watching the media content as a group, the mood of each user may change. The system detects changes in the context of the media content and the additional inputs provided by the users, and use the changes in the context of the media content and additional inputs to predict changes in the mood of the user. Changes to the predicted mood of each user may be used to generate additional social posts. The additional social posts are generated based on the changes in the context, additional inputs of the users in the group and posting preferences of the user. For instance, if the user responds to certain types of events in the media content or to certain type of inputs provided by other users, then the system generates the additional social posts. Alternately, if the frequency of the social posting by the user does not exceed a pre-defined frequency limit, then the system generates the social posting for the user. If, however, the frequency exceeds the pre-defined frequency limit, then the system may not generate the social posting for the user even when the user usually responds to certain context of the media content or to specific types of additional inputs from the other users.

In one implementation, a method for generating social posts for users watching media content, is disclosed. The method includes identifying the users viewing the media content as a group. Inputs are received from one or more users of the group viewing the media content. A mood of a first user in the group is predicted at a time when a portion of the media content is rendering. The prediction is based on context of the portion of the media content rendering at the time and the inputs received from the one or more of the users in the group leading up to the time of rendering of the portion of the media content. A social post is generated for the first user based on context of the portion of the media content and the predicted mood of the first user. The social post is forwarded to a client device of the first user for rendering.

In one implementation, the inputs provided by the one or more users in the group are related to the media content, or are related to inputs provided by one or more users in the group, or are inputs directed toward one or more of other users.

In one implementation, the social post is forwarded to the client device of the first user for rendering on a user interface provided alongside the media content. The social post is provided as a suggested input originating from the first user. The user interface includes an option for posting the suggested input in a comment section shared with the users in the group and rendered alongside the media content. The comment section includes at least some of the inputs provided by some of the users and shared with the users of the group.

In one implementation, the option for posting includes an option for editing the suggested input prior to posting the suggested input in the comment section.

In one implementation, the user interface includes a second option for posting the suggested input to a social media account of the first user as originating from the first user. The second option for posting includes a second option for editing the suggested input prior to posting the suggested input to the social media account of the first user.

In one implementation, the social post is forwarded to the client device of the first user for automatically posting in a social media account of the first user. The automatic posting to the social media account determined based on posting preference set by the first user or based on posting preference deduced from social interactions of the first user.

In one implementation, the mood of the first user is determined by parsing the inputs received from each of the one or more users of the group to identify input features. The input features of each input used to identify context of the input. The inputs are then classified based on the input features identified from the inputs.

In one implementation, an artificial intelligence (AI) model is created with a plurality of nodes and edges, each node of the plurality of nodes corresponds to input features and input classification and each edge between any pair of consecutive nodes corresponds to relationship between the input features and input classification included in the respective pair of consecutive nodes. The AI model is trained using additional inputs received from the one or more users in response to changes occurring in the content and context of the media content over time.

In one implementation, the mood of the first user is further determined by parsing the portion of the media content currently rendering to identify state data of the media content current rendering. Contextual features of the media content are identified based on the state data of the media content. The contextual features are classified to determine context of the media content. The AI model is trained using the context of the media content. The context of the media content changes with changes detected in the state data as the media data progresses to other portions.

In one implementation, the inputs provided by the one or more users in the group include inputs from the first user.

In one implementation, the media content is streaming content provided by an interactive application executing on a cloud server or by another user, or is a streaming pre-recorded media content provided by a content provider or by another user.

In one implementation, the inputs of each user in the group correspond to reaction of the respective user to the portion of the media content currently rendering or reaction to input provided by another user in the group. The inputs include text comments, audio comments, hashtags with comments related to the hashtags, audio content, image of the user captured using an image capturing device associated with a client device of the user, thumbs-up, thumbs-down, applause, memes, graphical interchange format files (GIFs), emojis, emoticons, or any two or more combinations thereof. The user providing the inputs is the first user or another user in the group.

In one implementation, the social post generated for the first user adopts interaction style of the first user, wherein the interaction style is defined in posting preferences set by the first user or is deduced by analyzing social interactions of the first user.

In one implementation, the social post generated for the first user includes an image of the first user or an icon or an avatar representing the first user.

The various implementations described herein disclose ways to predict mood of a user by taking inputs of not only the user but also from all other sources, such as inputs of other users in the group that are watching the media content with the user, input image capturing emotion of the user, audio content generated by the user, context of the media content, etc. The inputs from the various sources provide a more complete picture of current state of the media content and the interactions as it relates to the different users in the group. Based on the current state, mood of each user can be predicted. Based on the predicted mood of each user, appropriate social posts may be generated to appear to originate from that user. The social post for the user is generated to correlate with the predicted mood of the user and include an appropriate response that matches with the interaction style of the user. Even when the user has not provided any inputs, the system may be able to predict the mood of the user by relying on the inputs of other users and on the context of a portion of the media content rendering at the time the mood of the user is being predicted. In some cases, the system may have to consider inputs from the user and from the other users to predict the mood of the user. In these cases, the context of the media content may not be important or relevant and so may not be considered in the mood prediction. However, in order to associate the social post to a portion of the media content, the context of the portion of the media content may be considered. In other cases, the context of the media content may have to be considered to predict the mood of the user watching media content with other users as a group.

The mood prediction is used to generate the appropriate social posts for sharing with other users in the group. Machine learning algorithm is engaged to consider the inputs from all sources in order to determine the social posts to generate for each user, and also to determine type of social posts to generate as suggested posts for posting on a user interface of the client device for inclusion into a comment box and social posts for automatic posting to a social media account of the user. The user is provided with sufficient control to post the social post generated by the system to the comment box as-is, or to edit the social post before posting to the comment box for sharing with other users, or to discard the social post. The comment box includes the inputs of other users and the social post is posted to the comment box as input from the user.

When a group of users watch media content as a group, the system tries to predict each user's emotion in relation to what the user is watching and to what the user and the other users are saying in their inputs, and generates suggestive comments in the form of social posts for posting as inputs from the user. The suggestive comments may be posted in a comment box where all the inputs from other users are shared, or posted after user edits, and/or posted to the social media account of the user. The social posts are used to assist the user in their interactions while the user is engrossed in watching the media content with the other users.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIGS. 4A and 4B illustrate an example of a suggested social post generated for a user in a group for editing and inclusion in a comment box rendered alongside media content, in accordance with one implementation of the present disclosure.

DETAILED DESCRIPTION

Figure 1:
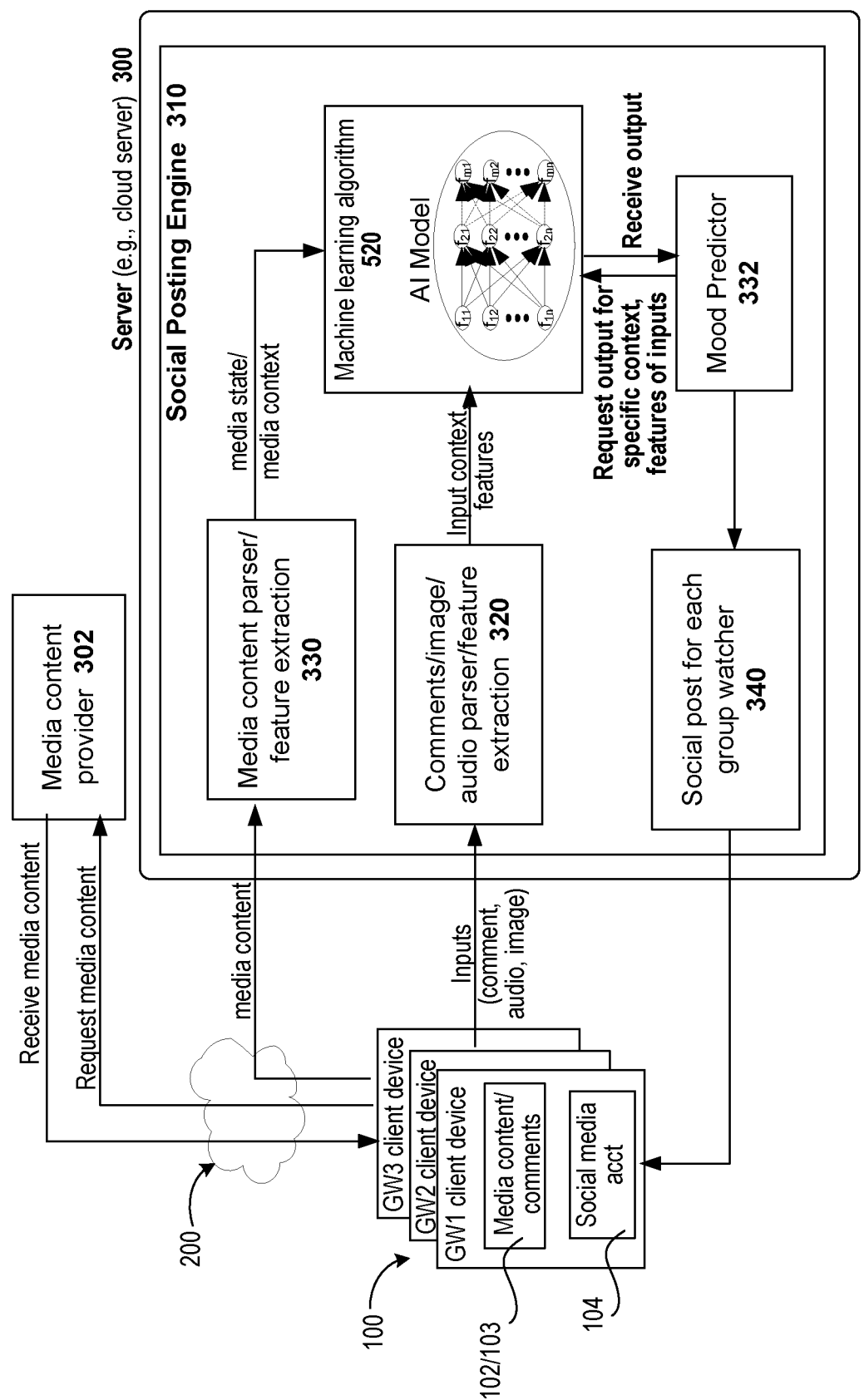
FIG. 1 illustrates a simplified block diagram of a system used for generating social posts for users of a group watching media content, in accordance with one implementation of the present disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

As more and more media content is being made available online, users are able to access the various media content and fully immerse in viewing and interacting with these media content. The media content available to the user includes streaming media content of live event, (e.g., a live game, live gameplay of a video game, live concert, live debate, etc.,) provided by media content provider or a user, or streaming pre-recorded media content (e.g., TV shows, movies, lectures, public or private events, video games, etc.,) provided by media content provider or a user, or pre-recorded media content available for viewing and sharing. The users are able to further enhance their viewing experience by coming together as a group to watch the media content. The online access allows the users to engage in group watching from the confines of their own space. In addition to having the ability to engage in group watching the users are also able to exchange comments related to the media content or other users. To allow the users to fully immerse in the group watching activity while allowing the users to interact with the media content without getting distracted, systems and methods are provided for automatically generating social posts for each user in the group by predicting the mood of the user at the time of generating the social posts and using the predicted mood to generate the social post with appropriate comments included therein. The comments included in the social post may be generated to adopt the social interaction style of the user. Consequently, the content included in the social post generated by the system may include comments pertaining to a portion of the media content that the users in the group are currently watching or may be comments provided in response to other user(s) comments, or may include comments about other users. The generated social post is provided for posting as user input in a comment box that includes inputs from other users in the group, wherein the comment box is rendered alongside the media content. The social post may also be provided for posting in a social media account of the user.

The advantage of the various embodiments discussed herein includes taking into account not only the input of a user for whom the social post is generated but also the context of the portion of the media content the user is currently watching with the group of users and inputs from the other users in the group. In some cases, even when the user has not provided any inputs, the social post for the user may be generated by taking into account the context of the portion of the media content the user is watching with other users in the group and the inputs from the other users. The inputs from the user (where available) and from other users along with the context of the media content being watched as a group provide a better perspective of predicting the mood of the user and for generating the social post for the user. The system is able to determine the emotion of the user by taking into account what portion of the media content the user is watching at the time of prediction, what the other users are saying about the media content and about other users (including the user), and generates the social post accordingly.

With the general understanding of the disclosure, specific embodiments will now be described with reference to the various drawings.

FIG. 1 illustrates a simplified block diagram of a system used to generate social posts for each user of a group of users engaged in watching media content, in one implementation. The system includes a server 300 on which a social posting engine 310 used to generate the social posts, is stored and executed. The server 300 is communicatively connected to client devices 100 of a plurality of users, over a network 200. In one implementation, the server 300 may be a cloud server within a data center (not shown) of an application cloud system. The data center includes a plurality of servers that provide the necessary resources to host one or more interactive applications that provide the necessary media content for the group of users to watch and during which the social posts can be generated, using the social posting engine 310, for each of the users watching the media content as a group.

In one implementation, the interactive application providing the media content may be a video game executing on the server 300. In this implementation, the server 300 is configured to store game code and instantiate the video game, when request for gameplay is initiated from one or more client devices 100. The server 300 may be configured to store and instantiate a plurality of video games. Alternately, the server 300 may have access to a video game stored on a different server. In this case, the server 300 may retrieve the game code and instantiate the video game. The video game may be instantiated by the server using resources of a data center in which the server is located, and generate video content stream (i.e., gameplay data) during gameplay of a video game. The generated gameplay data is compressed using compression techniques available to the server 300 and transmitted to the client devices 100 over the network 200. The game code of the video game can be instantiated on one or more cloud servers 300 within one data center or distributed across multiple data centers, and, when instantiated on a plurality of cloud servers 300, the game data is synchronized across the plurality of cloud servers 300. In this case, the gameplay data is provided as media content to the client devices 100 of users.

In another implementation, the server 300 may be a stand-alone server that is capable of executing an instance of a video game, or may be a server that is configured to manage one or more virtual machines that is capable of executing an instance of the video game to provide the data stream of gameplay, wherein the streaming may be done in real-time or delayed time.

Alternately, the server 300 may include a plurality of consoles and an instance of the video game may be accessed from one or more consoles (e.g., game consoles). The cloud server 300 may be independent consoles or may be rack-mounted server or a blade server. The blade server, in turn, may include a plurality of server blades with each blade having required circuitry and resources for instantiating a single instance of the video game, for example, to generate the gameplay data stream. Other types of cloud servers, including other forms of blade server may also be engaged for executing an instance of the video game application that generates the gameplay data stream. When the cloud server 300 is used for instantiating video game, the cloud server 300 receives game input from one or more players during gameplay, updates the game state of the game, and generates updated gameplay data. The updated gameplay data is streamed to the users in frames of gameplay data, wherein the users include players providing game inputs during gameplay and other users (i.e., spectators) who are accessing the video game to watch gameplay of the one or more players.

The video game may be a multi-player game or a single-player game. A game engine (not shown) executing on the server 300 (e.g., cloud server or stand-alone server or game console) is communicatively connected to game logic of the video game to provide a framework for the video game. The game engine is a software layer that serves as a foundation for the video game and provides the basic infrastructure (i.e., framework) for developing the video game. The game engine abstracts the details of doing common related tasks (i.e., game engine tasks) required for every video game, while the game code of the video game provides game logic detailing how the video game is to be played. The game code of the video game uses the modules included in the game engine to control virtual objects including virtual characters and virtual scenes within the video game and to generate gameplay data. Some of the basic core modules of the game engine used by the game code of any video game includes a physics engine (for collision detection, collision response, trajectory, movement of object based on gravity, friction, etc.), a rendering engine (i.e., a renderer) for 2D and 3D graphics, sound engine, scripting, animation, artificial intelligence, threading, networking, streaming, memory management, scene graphics, etc. These basic core modules of the game engine are reusable by different video games to generate gameplay data based on game state of the video game. The generated gameplay data includes animation provided by the different virtual characters, wherein the animation is based on the context of the video game used in generating the gameplay data.

The client devices 100 of users communicatively connected to the server 300 over the network 200, such as the Internet, receive the frames of gameplay data, decompresses the gameplay data, and renders it on a media content interface 102. Each client device (100) has a processor, memory and communication capabilities to access the network 200 using wired, wireless, or 4G/5G communication, etc., and may be portable or not portable. The client devices 100 may run an operating system and include network interfaces or could be thin clients with network interface to access the network 200 in order to communicate with the server 300, wherein the server 300 provides the computation functions. The network 200 can be a 3G, 4G or 5G networks.

The client devices 100 having 5G communication capabilities are capable of connecting to 5G networks. In one implementation, the 5G networks are digital cellular networks, where the service areas are divided into a plurality of "cells" (i.e., small geographical areas). Analog data generated at the mobile devices are digitized and transmitted as radio waves to a local antenna within a cell using frequency channels that can be reused in geographically separated cells. The local antenna is connected to Internet and telephone network by a high bandwidth optical fiber or other similar wireless communication. The 5G networks are capable of transmitting data at higher data rates as they use higher frequency radio waves for communication and, as a result, provide lower network latency.

In alternate implementation, the media content may be provided by a media content provider 302 hosted on a server that is separate from the server 300 on which the social posting engine 310 is stored and executed. The media content may be related to a live event (e.g., live game, live concert, live debate, live video capture of an event, etc.,) or a pre-recorded event and may be streamed or otherwise provided to the client devices 100 for rendering. The media content may be generated by the media content provider and transmitted to the client devices, or may be generated by another user and transmitted using the resources available to the media content provider to the client devices of users.

In response to the users (i.e., spectators) requesting the media content from the media content provider 302, the media content provider 302 validates the request from the users, and upon successful validation, forwards the media content to the client devices 100 of the users for rendering. The media content received at the client devices 100 are decoded and rendered on a media content interface 102 at the client devices 100. The users requesting the media content are engaged in group watching, wherein the users have come together at the same time to watch the media content. These users in the group may be co-located or remotely located. While watching the media content, the users may share inputs (e.g., comments) related to the media content and about one another. For instance, when the media content is gameplay content of a video game that is streaming to the client devices 100, the users (i.e., spectators) may comment on the outcome of the video game, the play style of a player, comment made by another user related to the video game or other users, or comment on other users. These inputs are different from the inputs provided by players, and are shared in a comment box 103 that is rendered alongside the media content interface 102. In addition to sharing inputs provided in the comment box, the users may share audio comments and also their images with other users.

When social posts are to be generated for each user, the media content and the inputs from the users are provided to a social posting engine 310 executing on the server 300, for processing. In the case where the media content pertains to video game, the gameplay data of the video game provided to the client devices 100 of the users are forwarded to the social posting engine 310. The social posting engine 310 processes the media content by parsing portion of the media content rendering at the time the social post is being generated to determine state data, identifying and extracting contextual features, and determining context of the media content for the portion of the media content, based on the extracted content features. Thus, for the video game, in addition to determining context, a current game state of the video game is also determined for the portion of the media content provided to the social posting engine 310. In the case where the media content is non-game related content, a current state of the media content is determined. In addition to processing the media content, the social posting engine 310 also processes the inputs provided by the users while the users were engaged in group watching. The processing of the inputs includes parsing the inputs to identify input features, and classifying the inputs based on the identified input features. It is noted that the inputs include comments shared in the comment box 103, audio comments, and images of users (if any).

The current state and the media context, of the media content, and input context and input features of the inputs are provided to machine learning algorithm 520. The machine learning algorithm 520 creates and trains an artificial intelligence (AI) model using the context and features identified for the media content and the inputs. As additional inputs are provided by the users and as changes occur in the media content over time, the AI model is further trained. The AI model uses the features and context of the media content and the inputs of the users to generate outputs corresponding to specific inputs provided by other users, specific type of media content, specific events occurring within the media content, and the type of comments included in the inputs of other users that are currently watching the media content. From the outputs of the AI model, each user's mood can be predicted.

A mood predictor 332 is used to query the AI model and receive output for specific context and features identified from the inputs of users and for a portion of the media content that is currently rendering at the client devices 100 of the users. The output from the AI model is used by the mood predictor 332 to predict mood of each user. Based on the predicted mood of each user, social post may be generated by the social posting engine 310. While generating the social post, the social posting engine 310 may refer to the social interaction style of each user and any posting preferences that each user may have set for the media content. Based on the social interaction style and the posting preference of the user, the social post may be generated. The generated social post is forwarded to the client device for rendering in a social post interface (not shown) for user to review and approve. Once approved, the social post may be posted to the comment box as input originating from the respective user. Additionally, the approved social post may be posted to a social media account 104 of the respective user. In alternate implementations, the social post may be directly posted to the social media account 104 of the respective user.

Figure 2:
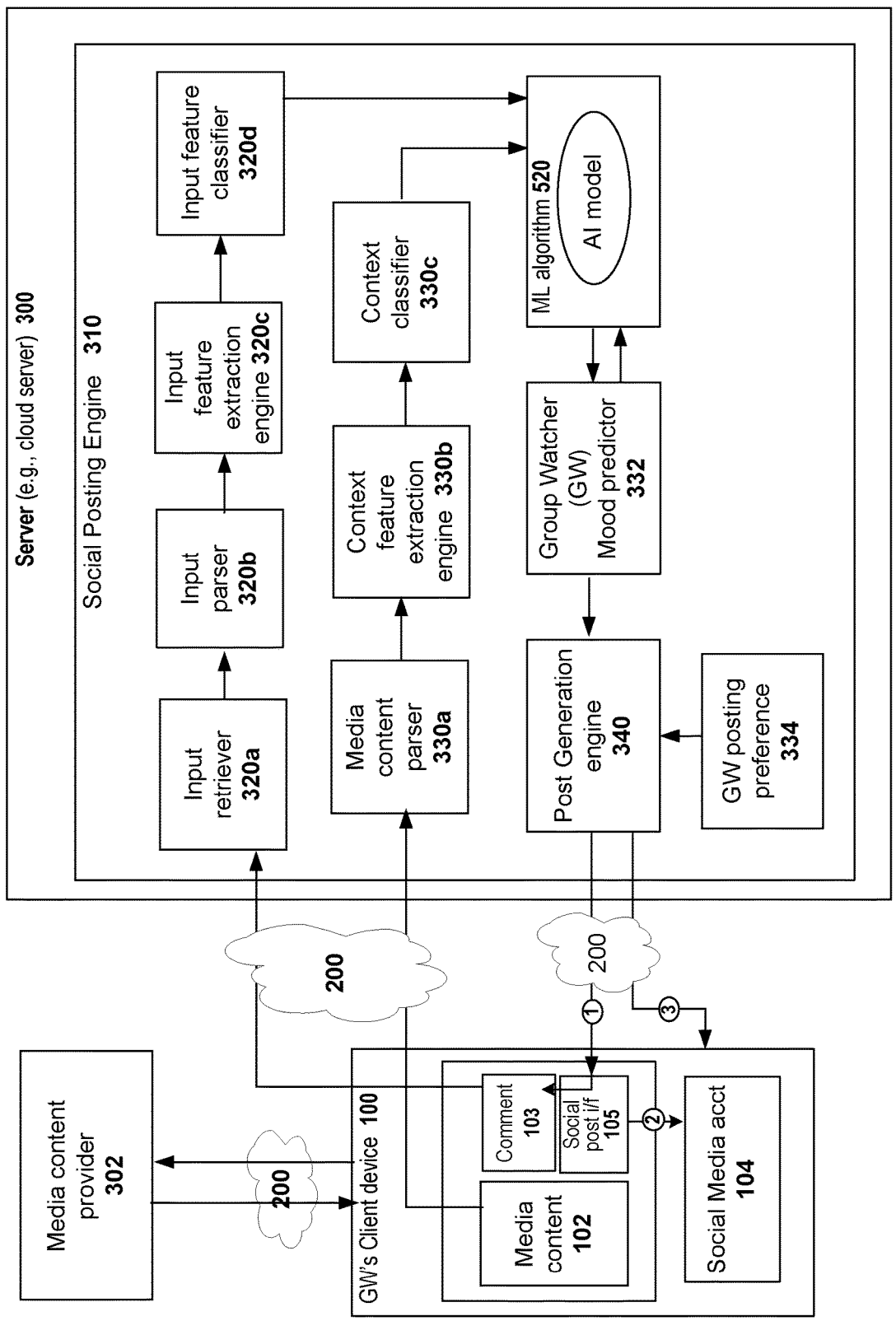
FIG. 2 illustrates a simplified block diagram of the different sub-modules of the social posting engine used to generate social posts for different users, in accordance with one implementation of the disclosure.

FIG. 2 illustrates a simplified block diagram of different sub-modules of a social posting engine 310 used in generating the social posts for users watching media content as a group, in one implementation. The sub-modules identified are provided as a mere example and should not be considered restrictive. Fewer or additional sub-modules may be included in the social posting engine 310. Some of the sub-modules used in generating social posting for users watching media content as a group includes an input retriever 320a, an input parser 320b, an input feature extraction engine 320c, input feature classifier 320d for processing inputs provided by users; a media content parser 330a, a context feature extraction engine 330b, context classifier 330c for processing media content; a mood predictor 332 for predicting mood of each group watcher, and a post generation engine 340.

It is to be noted that the term "engine" as used in social posting engine 310 or to represent the different sub-modules within the social posting engine 310, in one implementation, refers to a program or piece of code that is configured to perform a certain function. The program or code may use deep learning algorithm to query certain ones of the data and/or process the data (e.g., inputs from the users, images of the users, media content). In the case of social posting engine 310, the program defining the social posting engine 310 may be used to query the various inputs provided by or associated with the users of the group to identify features or characteristics of the interactions included in the inputs, classify the features/characteristics, and identify context of the inputs based on the classified features/characteristics. The various sub-modules included in the social posting engine 310 may assist in identifying the context of the inputs from the users and the context of the media content, which can then be used by machine learning algorithm to determine what media content and what portion of the media content the users are watching, what the users are saying about the media content or about one another, and predict the mood of each user in the group. The predicted mood may then be used to determine the way each user has previously reacted for similar mood and under similar circumstances (i.e., similar occurrence of events within the media content, similar comments about the media content from other users, similar comments about other users). Based on the predicted mood and contextual features of the inputs, the social posting engine 310 may be able to generate a social post for each user. The social posting engine 310 may be implemented as a software, a hardware, or firmware.

The input retriever 320a is used to retrieve inputs provided by the users and included in the comment box 103 rendered alongside media content that the users are engaged in watching as a group. In addition to the inputs retrieved from the comment box, the input retriever 320a may also retrieve any audio comments provided by the users and image of the users, where available, wherein the audio comments and image of the users are not part of the comment box. In one implementation, when the media content selected by the users for group watching is gameplay data, and since the inputs were provided by the users during gameplay of a video game, the inputs may be part of game data that is stored in a gameplay datastore (not shown). In such implementations, the input retriever 320a may query the gameplay datastore for the inputs of the users. If, on the other hand, the media content is any other content, then the users inputs may be stored in the user activity history maintained at the server (e.g., cloud server) 300 or may be stored alongside the content in the content history either maintained by the server 300 or available to the server 300. In such cases, the input retriever 320*a* may query the appropriate history database to obtain the inputs generated by the users while the users were watching the media content. The input retriever forwards the inputs retrieved from the appropriate database or datastore to the input parser 320*b*.

The input parser 320*b* parses the inputs to determine the type of content included in the inputs. The inputs provided by the users in the comment box 103 may include text comments, video content, memes, GIFs, emojis, emoticons, graphics, applauses, thumbs-up, thumbs-down, hashtags with content associated with the hashtag, etc. Consequently, the input parser 320*b* parses the inputs to identify the types of content included in the inputs. Based on the type of content included in the inputs, the inputs are processed differently. For instance, the textual content may be processed to identify keywords that may provide an indication of the mood of the user generating the input, mood of the user targeted by the input, tone of the content, etc. Similarly, the memes may be processed to identify the emotions expressed in the representative images included therein or the message contained within. Images of the users may be used to identify facial features that can be used to determine the emotions of the users, etc. Information related to the types of inputs and/or types of content included in the inputs are provided to the input feature extraction engine 320*c*.

The input feature extraction engine 320*c* identifies the features of the inputs so that the inputs and the content contained within the inputs can be properly classified. The features of the inputs (i.e., characteristics or attributes of the inputs) can be used to uniquely identify each input and associate the input to appropriate portion of media content and to appropriate user (e.g., user generating the input, user targeted by the input). Since the content included in the input provided by the users are in various formats, the input feature extraction engine 320 is configured to identify the type of content included in the input, and process the content of each input in accordance to the type in order to identify the features. For instance, for an input that includes memes, the input feature extraction engine 320*c* is configured to first identify the meme included in the input, and then process the meme to identify the message represented in the meme. In some cases, any images included in the memes may also have to be processed to identify the emotion expressed in the image in order to fully understand the message conveyed by the user providing the meme. Similarly, when the input includes graphics, the input feature extraction engine 320*c* may have to analyze the graphics to identify features that can be used to identify the message that is being conveyed through the graphics. In addition to the content that is being provided in the comment box 103, the input feature extraction engine 320*c* is also configured to receive the audio comments that the user provides to identify the features, such as language spoken, tone used, keywords used (e.g., by converting the audio to text using speech-to-text conversion module), etc. These features can be used to determine the context of the input. The feature information identified by the input feature extraction engine 320 is forwarded to input feature classifier 320*d*.

The input feature classifier 320*d* classifies the inputs in accordance to the features identified. The inputs may be classified based on the user(s) providing the inputs, target of the inputs (i.e., is the input commenting on an event or action occurring in the media content or directed toward another user in the group), the tone of the input, content included in the input (e.g., adult-rated, children appropriate, etc.), emotion conveyed by the input (e.g., encouraging language, mocking language, berating language, harassing language, etc.), type of content included in the input, etc. Based on the classification, the context of the input may be determined by the input feature classifier 320*d*. The input features and context identified from the inputs are fed to a machine learning algorithm 520.

The media content that is rendering at the client devices of the users at the time the social post is being generated by the social posting engine 310, are also processed in a manner similar to the processing of inputs from the users. The media content is processed to determine the context and to identify other relevant features that may be used for generating the social post. A media content parser 330*a* is used to parse the media content to identify features of the media content. The media content parser 330*a* parses the portion of the media content that is currently rendering at the client devices of the users to determine the state data and the type of action or event that is occurring, and for the media content that includes gameplay data, the virtual location within the video game and the virtual scene (i.e., level within the video game) that is currently rendering at the client devices, the virtual characters that are involved in the virtual scene, type of action that is occurring, amount of game winnings/lives available, etc. The details parsed from the media content are forwarded to a context feature extraction engine 330*b*.

The context feature extraction engine 330*b* uses the details from the parser to identify the context of the media content and to appropriately classify the various attributes associated with the media content. For instance, for gameplay data, the various attributes (e.g., game level, the virtual characters that are involved, the type of action that is occurring, etc.,) identified by the media content parser 330*a* may be used by the context feature extraction engine 330*b* to deduce the context (e.g., what event is occurring, which virtual character is having the advantage, etc.,) of the video game. The context information deduced by the context feature extraction engine 330*b* is provided to a context classifier 330*c*.

The context classifier 330*c* classifies the portion of the media content based on the various attributes and the context of the portion of the media content. For instance, based on the various attributes and the context of the portion of the media content, it may be determined that the portion of the content currently rendering relates to a "Boss fight," wherein a virtual character controlled by a player is battling the Boss and from the features determines who is winning. The context classifier 330*c* classifies the portion of the media content as a Boss fight scene. The classification and context of the media content may be used to associate the inputs of the users to appropriate portion of the media content. The classification and context of the media content may also influence the mood of the users watching the media content. For instance, if the virtual character battling the Boss is winning, the users may be elated versus when the virtual character is losing. Information from the context classifier 330*c* is forwarded to the machine learning algorithm 520 for further processing.

The machine learning algorithm uses the media context, media classification information from the provided by the context classifier 330*c* and the context of inputs, classification of the inputs from the input feature classifier 320*d* and creates an artificial intelligence (AI) model. The created AI model is trained as additional inputs from the users are received and as the context of the media content changes over time. The AI model includes a plurality of nodes and edges defined between consecutive pair of nodes. Each node corresponds to input features, input context and media content attributes and context, and the edge between any two consecutive nodes defines the relationship between the input features, context and media attributes and context. As additional inputs and updates to the context of the media content are received, the AI model is finely trained to achieve defined output goals. The output goals, in one implementation, may define the type of media content that elicits user response or reaction, the type of activity or event within the media content that elicits user response or reaction, the type of comment from another user that elicits user response or reaction, to name a few.

A mood predictor 332 uses the outputs from the trained AI model to predict the mood of each user in the group (i.e., group watcher) who is engaged in group watching. The mood predictor 332 queries the AI model for the outputs for the current context of the portion of the media content and for the inputs received from different users up till the current state of the media content, and uses the output to predict what the user's mood is based on what is occurring in the media content and what other users are commenting. In addition to other users' comments, the mood predictor 332 may also use the inputs of the user for whom the mood is being predicted to predict the mood of the user for the current context of the media content. The predicted mood of each user is provided to the post generation engine 340 to determine the type of social post that needs to be generated for the user.

The post generation engine 340 uses the predicted mood of each user provided by the mood predictor 332 and refers to posting preference 334 defined by each user to determine if a social post needs to be generated for the user. The posting preference set by a user may specify that the system can generate a social post in accordance to the frequency defined by the user, for certain types of events occurring in the media content, for certain types of comments from other users, etc. The posting preference may be defined by each user differently and the post generation engine 340 generates a social post for a user in accordance to the posting preference set by the user. In some implementations, the social post may include a hashtag. The inclusion of the hashtag in the social post generated for the user may be based on the interaction style of the user, wherein the interaction style may identify the specific type of media content or specific type of comment of other user(s) that has previously elicited the hashtag post from the user. The interaction style of the user may be deduced or determined by analyzing the history of social interactions of the user for the video game and/or for other interaction applications including social media applications. The presence of the hashtag in the social post generated for the user is indicative that the content included with the hashtag is to be automatically posted to the social media account of the user.

The social post generated for each user may be forwarded to the client device 100 of the respective user for rendering in a social post user interface 105, as shown by bubble 1. The social post user interface 105 may include a plurality of options providing control to the user of the social post for managing what is being posted under their name/account. For example, the social post user interface 105 may include a first option to allow the social post generated for the user by the post generation engine 340 to be posted to the comment box 103 as input originating from the user, a second option to edit the social post provided by the post generation engine 340 prior to posting the social post to the comment box 103, and a third option to cancel the post. These options that are included in the social post user interface 105 provide a level of control for the user, wherein the options allow the user to review the social post before allowing the social post to be posted to the comment box 103 on behalf of them while allowing the system to generate the social post on behalf of the user. In addition to posting the social post to the comment box 103 the options provided at the social post user interface 105 may include another option to post the social post to a social media account 104 of the user, as shown by bubble 2. As with posting the social post to the comment box 103, the social post is posted to the social media account 104 of the user as though it is originating from the user.

In an alternate implementation, the social post generated by the post generation engine 340 may be posted directly to the social media account 104 of the user. The direct posting of the social post may be determined based on the posting preference specified by the user, posting style determined from analysis of interaction history of the user, or may be based on the type of social post generated. For instance, the user may specify in their posting preference 334 that any social post that does not include angry or biased language, or include the identity of the poster, or is relevant to the media content currently rendering, or does not target another user in a demeaning or harassing way may be automatically posted to the social media account 104 of the user. In another instance, based on the social post type, the social posts may be posted directly to the social media account 104 of the user. For example, the social post generated with a hashtag may be automatically posted to the social media account 104 of the user. In yet another instance, the user may have always posted social interactions related to certain event occurring in the media content (e.g., interaction related to a "Boss fight" scene in a video game) directly to their social media account. Based on the posting preference 334 of the user, the posting style of the user, and the type of social post generated for the user, the post generation engine 340 may forward the social post generated for the user for automatic posting to the user's social media account 104, as shown by bubble 3. In some implementations, prior to automatic posting of the social post, the post generation engine 340 may verify to ensure that the social post falls within a pre-defined frequency of posting prior to forwarding to the social media account 104 of the user for automatic posting. The pre-defined frequency may be specific for the user, for the media content, for the social media account of the user, or for the group of users as a whole. Once the social post is forwarded to the social media account 104 of the user, the social post is automatically posted to the social media account 104 of the user.

Figure 3:
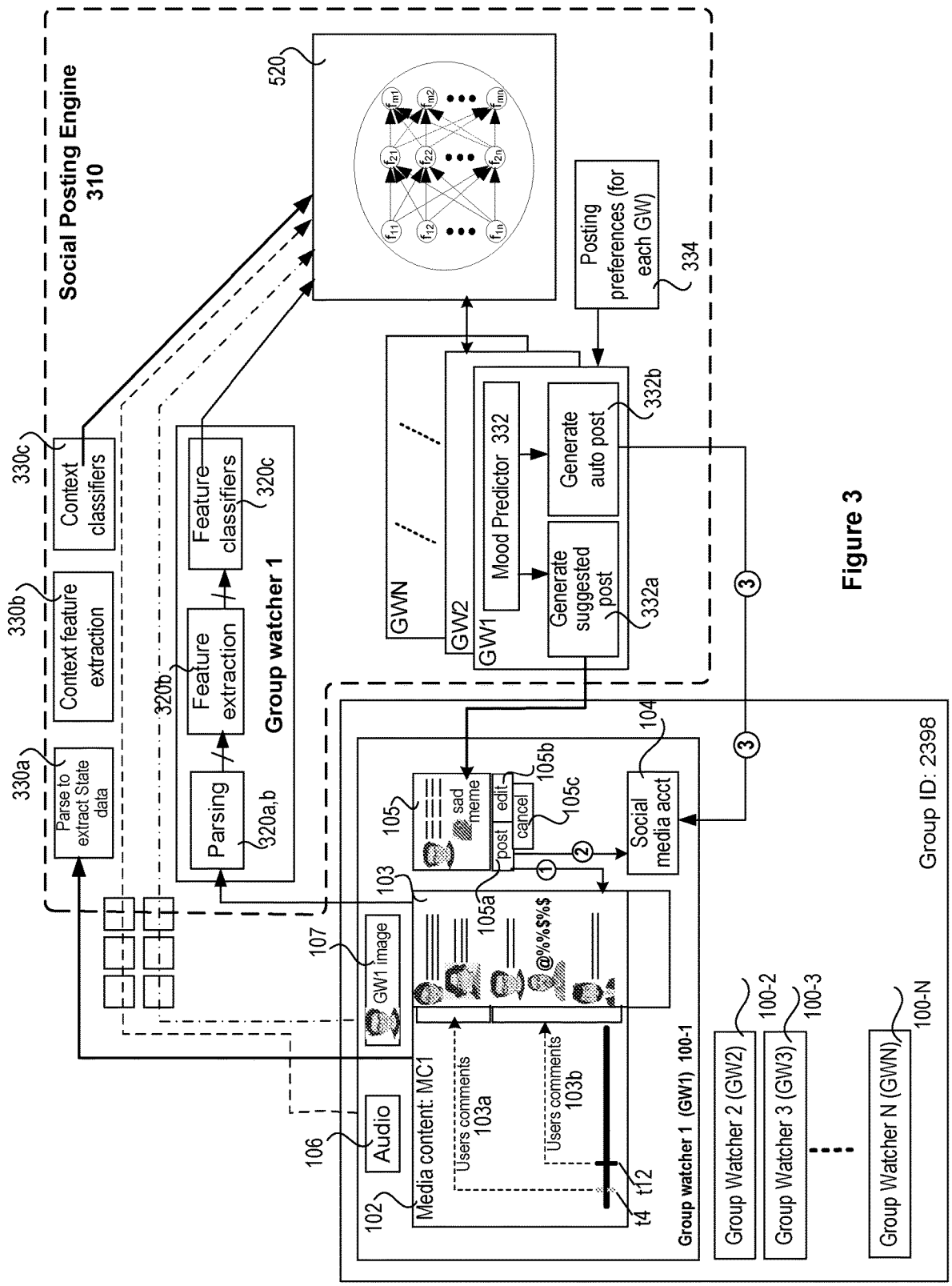
FIG. 3 illustrates a simple process flow followed by a social posting engine for generating social posts for users engaged in watching media content as a group, in accordance with one implementation of the present disclosure.

FIG. 3 illustrates the process flow followed by the social posting engine 310 when generating a social post for a user watching media content with a group of users, in accordance with one implementation. The user associated with client device 100-1 may be part of a group of users that have logged in to watch media content MC1, as a group. The group may be assigned a group identifier (ID) and the users that are part of the group are associated with the group ID. The group ID assigned to the group may be a randomly generated identifier or may be a sequentially assigned identifier. In the example illustrated in FIG. 3, the users (i.e., group watchers) of the group who have joined together to watch media content MC1 are associated with group ID 2398 and include users GW1, GW2, GW3, . . . GWN. The users are viewing the media content MC1 using their respective client devices 100-1, 100-2, 100-3, . . . 100-N, respectively. The media content is rendered within a media content interface 102 defined in a portion of a display screen associated with the respective client devices 100. When the media content is a pre-recorded media content, the media content interface 102 may also include an interactive timeline that provides an indication of what portion of the media content MC1 the users are currently watching. As the media content is rendering (i.e., progressing along the timeline), users may be providing inputs, in the form of comments, that are rendered in the comment box 103 shared with other users in the group. As the inputs are received, the inputs are associated to the appropriate portion (i.e., frame(s)) of the media content identified using the timeline, for example. For instance, the users may provide inputs in the form of comments 103a at time t4 of the media content MC1 and are therefore associated with the portion (i.e., frames) of media content that was rendered at time t4. These inputs are provided in the comment box 103 and shared with other users in the group 2398. As the media content MC1 progresses over time, additional inputs 103b may be provided by the users at time t12. FIG. 3 shows a simplified block view of a sample display screen of the client device 100-1 associated with user 1 (i.e., group watcher 1) that shows the different user interfaces defined thereon for rendering different content. For example, as shown, the display screen of the client device 100-1 is divided into different sections with each section used for rendering specific content. In some implementations, the sections defined on the display screen may be specific for each user and may be defined by the user in their rendering preferences. As such, the display screen of client device 100-1 includes a media content interface 102 defined prominently (i.e., covering major portion of the display screen) for rendering the media content MC1 and any interactive timeline where available, a comment box 103 defined alongside of the media content interface 102 for rendering the inputs from the users (e.g., comments 103a at time t4, 103b at time t12, etc.), a social post user interface 105 defined alongside the comment box 103 for rendering a social post generated for the user GW1 by the social posting engine 310, and a social media user interface in the social media account 104 of user GW1 where the social media content of the user GW1 is rendered. In addition to the aforementioned user interfaces, other user interfaces may also be rendered in the display screen. Similar user interfaces for rendering the media content, comment box, social post, and social media account may be provided on the display screen of client devices 100-2, 100-3, . . . 100-N of other users in the group.

In addition to comments provided in the comment box 103, audio comments 106 may also be provided by the user GW1. These audio comments 106 may be related to the media content or may be related to comments made by other users (i.e., group watchers of the group 2398, for example) or comments made about other users in the group. The audio comment 106 may be received periodically or sporadically from user GW1. In addition to the audio comment 106 and the inputs in the comment box 103, the user GW1 may also opt to share their own image 107 during the rendering of the media content MC1. The user GW1's image 107 may be captured using image capturing device available within or to the client device 100-1 and may be used to show the user GW1's reactions to the media content as part of group watching. The user GW1's image 107 may be used to determine the emotions expressed by the user GW1 at different times as they are watching the media content MC1.

The inputs from each user (i.e., each group watcher (GW1, GW2, GW3, . . . GWN) in the group are forwarded to the social posting engine 310 for further processing. The inputs include the various types of comments (e.g., text, video, memes, GIFs, emojis, emoticons, graphics, audio files, applause, thumbs-up, thumbs-down, etc.) shared by the users in the comment box 103, the audio comments 106 and the image(s) of the users 107, where available. Each user's (groups watcher's—GW) inputs are processed by the social posting engine 310 by parsing the inputs using the input retriever, input parser 320a, 320b using a input parser to identify the types of inputs included, the various features of each type of input, such as content, keywords in the case of textual content, tone of content, emotion expressed (in case of images, GIFs, memes), subject of the comment included in the input, originator of the input, etc. The identified features are extracted by input feature extraction engine 320c and used by input feature classification engine (otherwise referred as "input feature classifier") 320d to classify the inputs from the different users. In addition to classifying the inputs, the input feature classifier 320d may also determine the context of each input. The classification, the context and the features are provided as input to the machine learning algorithm 520 to generate an artificial intelligence (AI) model and train the AI model. The AI model is trained using additional inputs received from the different users (i.e., group watchers) of the group as they continue to watch the media content.

The audio comments and the image(s) shared by each user may also be processed in a similar manner as the inputs from the comment box, by parsing the content to determine the features of the audio comment and the facial features of the images of each user, extract the features, classify the features and determine the context of the audio comments and the emotion(s) expressed by the respective user using the facial features captured in their images. The audio comments and the image(s) of each user may be processed using the input retriever 320a, input parser 320b, input feature extraction engine 320c, input feature classifier 320d that is used to process the inputs of the users included in the comment box 103 or may be processed by a different set of input retrievers, parsers, feature extraction engine and feature classifiers (not shown). The inputs, the audio comments and facial features change over time and change based on changes detected in the media content the users are watching as a group. As a result, the context, the emotions, and the various features associated with the inputs also change. The changes to the context, emotions, and features associated with the inputs are provided as updates to further train the AI model. The updates to the AI model are used to refine the outcomes of the AI model.

In addition to the inputs from the users, the media content is also processed to identify the attributes of the content included within and to classify the attributes of the media content. The portion of the media content currently rendering at the client devices 100 of the users are parsed using media content parser 330a to determine the state of the media content. When the media content relates to a video game, the state of the media content may be the game state (i.e., identified by the level of the video game, the virtual location of the video game, etc). Similarly, when the media content is a streaming pre-recorded media content, the state may correspond to the location in the timeline of the portion of the pre-recorded media content that is currently rendering at the client devices 100. The state of the game and the media content are then used to identify the attributes of the media content, which can be used by the context feature extraction engine 330b to determine the context of the portion of the media content currently rendering at the client devices 100. The context and the attributes of the portion of the media content are used by the context classification engine (otherwise referred to as "context classifier") 330c to classify the portion of the media content. The classification may identify the type of virtual scene that is currently being rendered, when the media content is gameplay data of a video game, the characters that are in the virtual scene, whether the virtual scene is an action scene, a comedy scene, or includes a specific type of challenge, etc. As with the inputs, the context, the attributes, etc., of the media content is provided as input to the machine learning algorithm 520 to further train the AI model. The training of the AI model results in refining the outputs so that the outputs are more aligned with the defined output goals.

A mood predictor 332 is used to predict the mood for each user (i.e., group watcher). The mood predictor 332 queries the AI model to identify the output that corresponds to user GW1, wherein the output for each user is based on the inputs provided by other users (GWs) that are directed toward or are related to the user GW1, and the context of the portion of the media content currently rendering when the mood of the user is being predicted. The current context of the media content is relevant to the predicted mood of the user GW1 as the predicted mood may be related to what is occurring in the portion of the media content. Similarly, the inputs collected from each user including the user GW1 up till the time of the current portion of the media content may be relevant as the inputs from the users may drive certain emotional reaction from the user GW1. Thus, using the inputs from not only the user GW1 for whom the mood is being predicted but from all the users provides a more relevant prediction of the current mood of the user GW1. Based on the predicted mood of each user, the social posting engine 310 generates a social post for each user. The social post may be generated as a suggested social post 332a or an auto social post 332b. The suggested social post 332a requires user GW1's approval prior to being posted to the comment box 103 and the social media account 104 of the user GW1, whereas the auto social post 332b does not require user approval. The social post is generated based on the posting preferences specified by each user or determined for each user based on the history of social interaction of the respective user and may include an image or an avatar representation or an icon of the user GW1.

The suggested social post 332a generated for the user GW1 may be forwarded to the client device 100-1 of the user GW1 in the social post user interface 105, for rendering and for user approval. The social post user interface 105, in addition to rendering the social post, may include a plurality of options for user selection to allow the user GW1 to manage the social post. As the social post is being posted as originating from the user GW1, it is only appropriate to allow the user to review the social post before the social post can be shared with other users. In one implementation, the social post user interface 105 includes a "post" option 105a that the user can select to post the social post as-is to the comment box 103, as shown by bubble 1. In addition to or instead of posting the social post to the comment box 103, the post option 105a may allow the user GW1 to post the social post to the social media account 104 of user GW1, as shown by bubble 2. In this case, the post option may include sub-options for selecting to post only to the comment box 103 (bubble 1), only to the social media account 104 (bubble 2), or to both the comment box and the social media account (bubbles 1 and 2) of the user GW1. The posting, as noted, is made to appear that it is originating from the user GW1. Consequently, the suggested social post 332a is generated to adopt the interaction style of the user GW1. The interaction style of each user may be specified in the posting preferences 334 or may be determined by analyzing the history of social interactions of the user GW1 including interactions of the user GW1 for the media content, interactions of the user GW1 in the group while the user is watching other media content. User selection of the option(s) included in the social post user interface 105 would result in the social post generated for the user to be posted to the comment box 103 and/or to the social media account 104 of the user GW1.

In addition to the post option, the social post user interface 105 may include an "edit" option 105b to allow the user GW1 to edit the social post generated by the social posting engine 310 prior to posting the social post to the comment box 103 and/or the social media account 104 of the user GW1. The edit option 105b allows the user GW1 to adjust, add or delete certain portion of the social post, prior to allowing the social post to be posted to the comment box 103 and/or the social media account 104 of user GW1. For instance, the user may be allowed to add a GIF or a meme or additional comment or content to the existing content of the social post or may be allowed to alter language included in the content, etc. A third option, "cancel" option 105c may also be provided at the social post user interface 105. The cancel option 105c, which when selected by the user GW1, cancels or discards the social post. The user GW1 may select to discard the social post for any reason. For instance, the user GW1 may they feel that the social post was inappropriate or was not timely or was improperly directed toward another user or was improperly reactive to another user's comments. The social posting engine 310 provides sufficient control to each user (i.e., GW1, GW2, GW3, . . . GWN) for managing the social posts generated for them.

In the case of auto social post 332b, the social posting engine 310 forwards the social post (i.e., auto post) directly to the social media account 104 of the user GW1. The social posting engine 310 may determine the type of posts that can be posted directly to the social media account of each user, and such determination is made by referring to each user's posting preference 334. For instance, a social post may be generated by the social posting engine 310 and a hashtag may be associated with the content of the social post. Or a social post may be generated to include comments or content related to the media content, or may include content that includes positive comments to encourage another user, etc. Social post with such content may be automatically posted to the social media account of the user GW1, as shown by bubble 3. It is to be noted that the auto social post 332b is generated for the user GW1 for posting to their social media account 104 and not for sharing with users in the comment box 103, whereas the suggested social post 332a is generated for the user GW1 for sharing with other users in the comment box 103 as well as in the social media account 104.

The various implementations discussed allow the social posting engine 310 to use machine learning to figure out what kind of posts to generate as suggested social post 332a, what kind of posts to generate as auto social posts 332b. The different social posts (332a, 332b) are generated for each user based on what each user approved previously, each user's general style of interaction, what content that each user commented on, tone of comment, frequency of comment etc. The social posting engine 310 takes into account inputs from every user (i.e., group watcher) in the group as well as the context and state of the media content to create and train the AI model, so that the social post for each user is generated with full perspective of what is occurring in the group and in the media content and not just relying on a single user's input, even when the single user is the user for whom the social post is being generated. Consideration of the single user's input may be misleading as the single user's input may be interpreted immaturely or misinterpreted as the input from the user may not relate to the context of the media content. To ensure that the user's interactions are interpreted correctly and the social post is generated in relation to the context of the media content and/or the context of other users' inputs, inputs from all sources are considered, including from other users, from social media content, for predicting the mood of the user and for generating the social post for each user based on the predicted mood.

FIGS. 4A and 4B illustrate an example representation of a suggested social post 332a that is generated for posting to the comment box and to the social media account of a user, in one example implementation. FIGS. 4A and 4B illustrates only a portion of the content that is rendered on a display screen of a client device 100-1 of user GW1, wherein the portion that is shown includes the comment box 103 in which users have shared their comments, the social post user interface 105 for posting suggested social post 332a provided by the social posting engine 310, and the social media user interface of the social media account 104 that renders social media account of the user GW1. In the example shown in FIG. 4A, the suggested social post 332a has been provided for user approval before the suggested social post 332a is posted as input from the user GW1 to the comment box and/or the social media account 104 of the user GW1. The suggested social post 332a, in one implementation, is forwarded in a social post user interface 105. The social post user interface 105 includes a plurality of options to allow the user to view the social post and adjust the social post, if need be, prior to posting the suggested social post 332a to the comment box 103, for example. The user is provided with the post option to post the suggested social post as-is to the comment box 103 for sharing with other users in the group, an edit option to edit the suggested social post 332a before posting to the comment box 103, and a cancel option to discard the suggested social post 332a generated for the user GW1.

In the example illustrated in FIG. 4A, the user GW1 has selected the edit option (highlighted in grey) to edit the suggested social post 332a. As part of editing, the user GW1 has added meme content 332c for inclusion with the suggested social post 332a. Upon completion of the edit, the user GW1 may select the post option to post the suggested social post 332a with the edits to the comment box 103 and/or the social media account 104. FIG. 4B illustrates the outcome when the user GW1 selected the post option (highlighted in grey). As shown, the suggested social post 332a with the addition of the meme content 332c is posted to the comment box 103, as shown by bubble 1, and the social media account 104 of user GW1, as shown by bubble 2. As previously stated, the user may select to post the suggested social post 332a with the meme content 332c to the comment box 103 only or to the social media account 104 only or to both the comment box (also referred to as comment section) 103 and the social media account 104. In the example shown in FIG. 4B, the user GW1 has chosen to post in both the comment box 103 and social media account 104. As a result, the suggested social post has been moved out of the social post user interface 105 and included in the comment box 103 and the social media account 104 of user GW1.

Figure 4C:
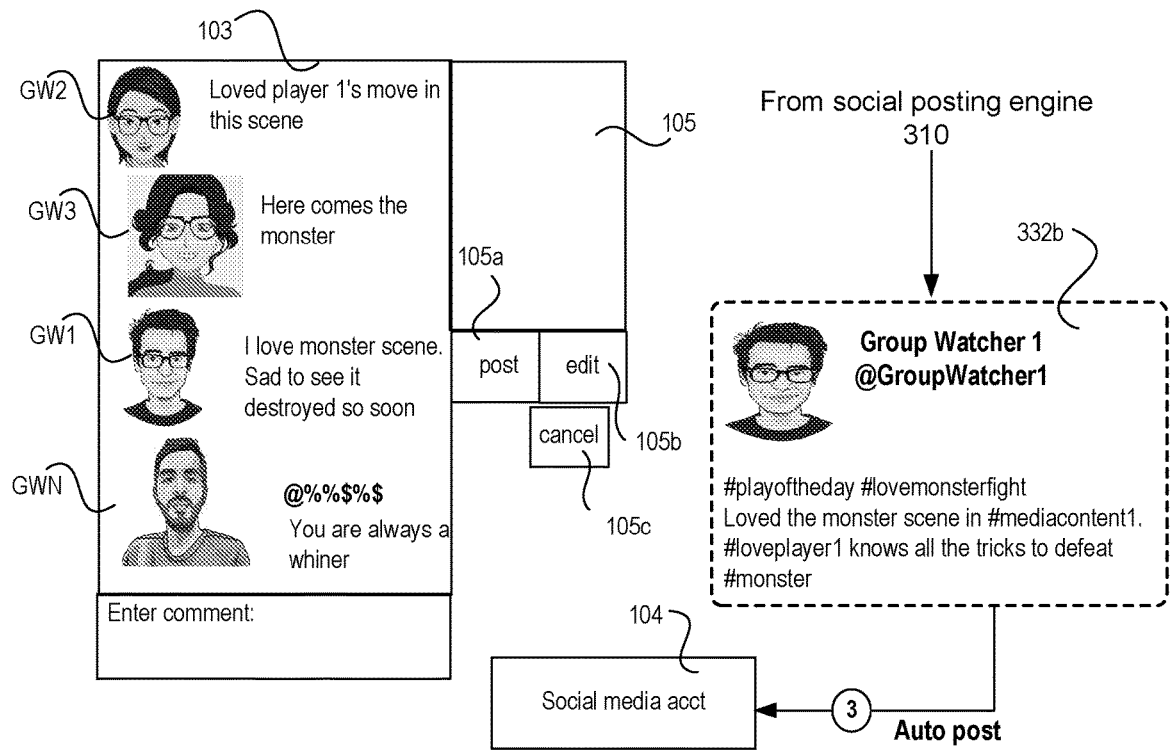
FIGS. 4C and 4D illustrate an example of an auto social post generated for a user in a group for automatically posting to a social media account of the user, in accordance with one implementation of the present disclosure.
Figure 4D:
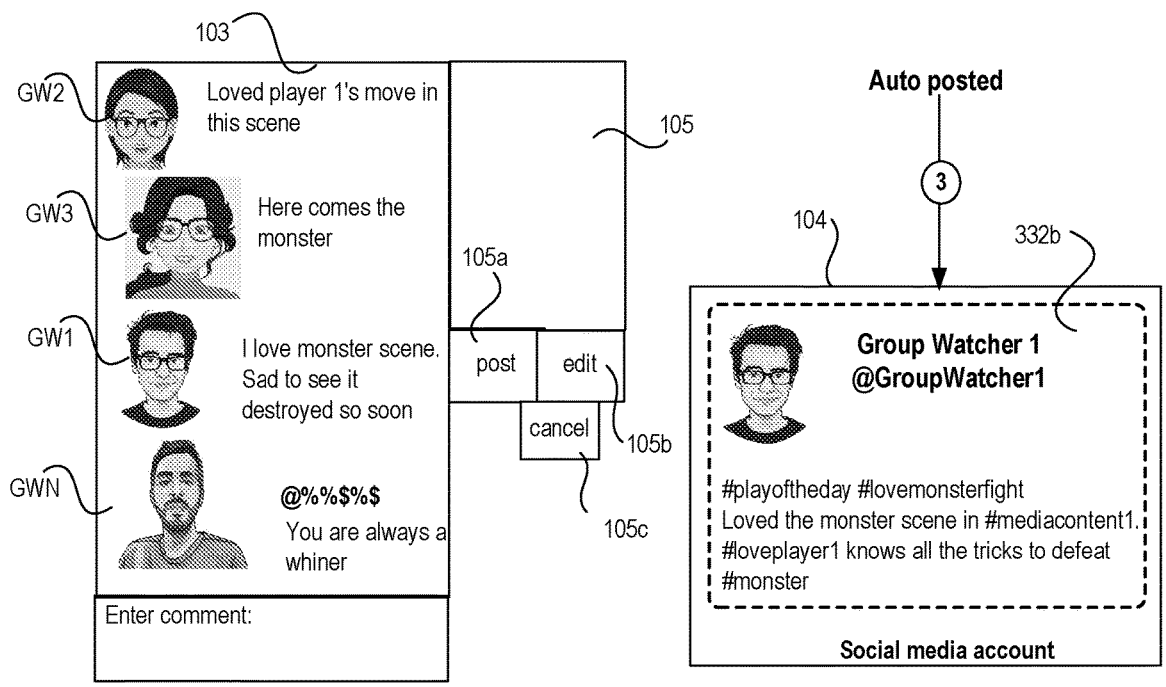

FIGS. 4C and 4D illustrate an example representation of an auto social post 332b that is generated for directly posting to the social media account 104 of a user GW1, in one example implementation. As with FIGS. 4A and 4B, FIGS. 4C and 4D illustrate only a portion of the content that is rendered on a display screen of a client device 100-1 of user GW1, wherein the portion that is shown includes the comment box 103 in which users of the group have shared their comments, the social post user interface 105 for posting any suggested social post 332a provided by the social posting engine 310, and the social media user interface of the social media account 104 that renders social media account of the user GW1. The social posting engine 310 has generated an auto social post 332b that includes hashtags and content related to the media content. FIG. 4C illustrates one such example of the auto social post 332b generated for user GW1. The auto social post, in this example, includes at least one hashtag. The auto social post 332b is forwarded by the social posting engine 310 for automatic posting to the social media account 104 of the user GW1, as shown by bubble 3. FIG. 4D illustrates the result of the auto posting operation (bubble 3) wherein the auto social post 332b is shown as being posted directly to the social media account of the user GW1. In this example, unlike the example illustrated in FIGS. 4A and 4B, the auto social post 332b has been posted without requiring user approval. The auto social post 332b may be generated after verifying that the auto social post 332b does not exceed a pre-defined limit of postings. In one implementation, the pre-defined limit may be set for the social postings said to be originating from the user GW1, and/or for the media content, and/or for the group.

Figure 5:
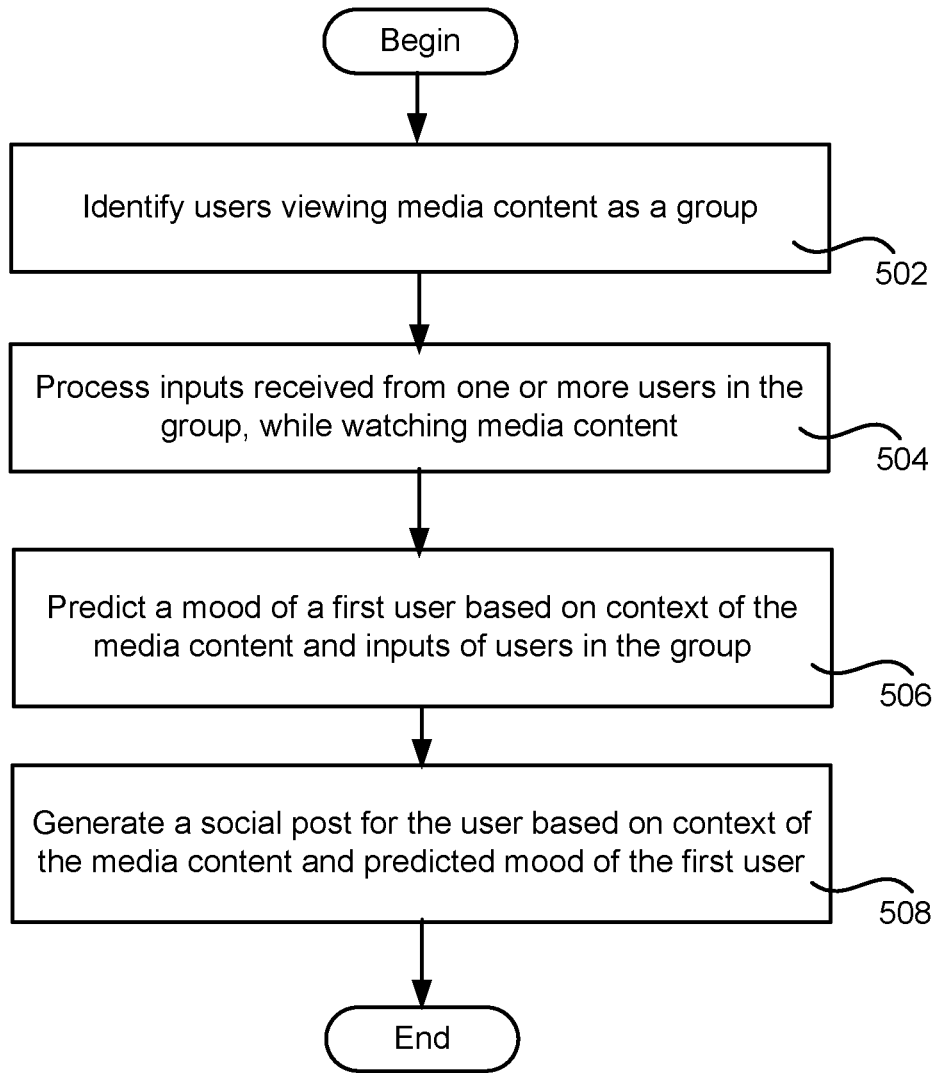
FIG. 5 illustrates flow operations of a method for generating social posts for users watching media content as a group, in accordance with one example implementation of the present disclosure.

FIG. 5 illustrates flow of operations of a method used for generating social posts for users watching a media content as a group, in one implementation. The method begins at operation 502 wherein the users viewing the media content as a group is identified. The group of users may have selected the media content for watching at a specific time and may have logged into the appropriate cloud account, for example, to view the media content. As the users are watching the media content, the users may interact with one another exchanging comments about the media content and about one another. The comments exchanged between the users are received and rendered in a comment box as inputs from the users and shared with the users of the group, as illustrated in operation 504. The inputs from the users are processed by parsing the inputs to identify features, extracting the identified features, and classifying the features. The features and classification are used to determine the context of the inputs originating from the different users in the group. In addition to processing the inputs, the portion of the media content that is currently rendering is also parsed to identify attributes, extract the identified attributes, and classify the attributes and the portion of the media content. Using the classification and the attributes of the media content, the context of the media content is determined.

The features, context and classification of the inputs, and features, context and classification of the media content are provided as inputs to a machine learning algorithm. The machine learning algorithm uses the inputs to create and train an AI model. The AI model is created with features of inputs, attributes of the media content, context of the inputs and the portion of the media content as nodes, and the relationship between the content of each any two consecutive nodes as edges. As additional inputs and changes to the context of the media content are received, the AI model is finely trained. The trained AI model defines outputs that correspond to emotions of each user based on the inputs that are directed to or related to the user. The trained AI model is queried to obtain outputs corresponding to each user. The outputs from the AI model are used to predict the mood of each user. In one example, the output from the AI model is used to predict the mood of a first user, wherein the mood of the first user is predicted based on context of the media content and inputs of the users that relate to the first user, as illustrated in operation 506.

Based on the predicted mood of the first user and on the context of the portion of the media content that is currently rendering, a social post is generated for the first user, as illustrated in operation 508. The social post may be generated to mimic the interaction style of the first user and may be generated as a suggested social post or an auto social post. When the suggested social post is generated, the suggested social post is forwarded in a social post user interface 105 to the client device for rendering for first user's review and approval. Upon the first user's approval, the suggested social post is posted to the comment box that includes the inputs of the other users shared within the group. The suggested social post is posted as originating from the first user. Additionally or alternatively, the suggested social post may be posted to the social media account of the first user. When the auto social post is generated, the auto social post is forwarded to the client device of the first user for automatically posting to the social media account of the first user.

The social posts generated by the social posting engine 310 and rendered in the comment box and/or the social media account of each user of a group of users watching the media content together, can be used for discussions both online and offline. The social posts rendered in the social media account of each user allows for offline discussions as these social posts have been generated with better understanding of the context of the media content and the context of the inputs of the users. As these social posts are made available in the social media account, the users can have discussions about the subject matters discussed in the social posts outside of the group watching session of the media content, allowing the users to continue their discussions after completion of rendering of the media content. Other advantages will become apparent to one skilled in the art upon reading the various implementations provided herein.

Figure 6:
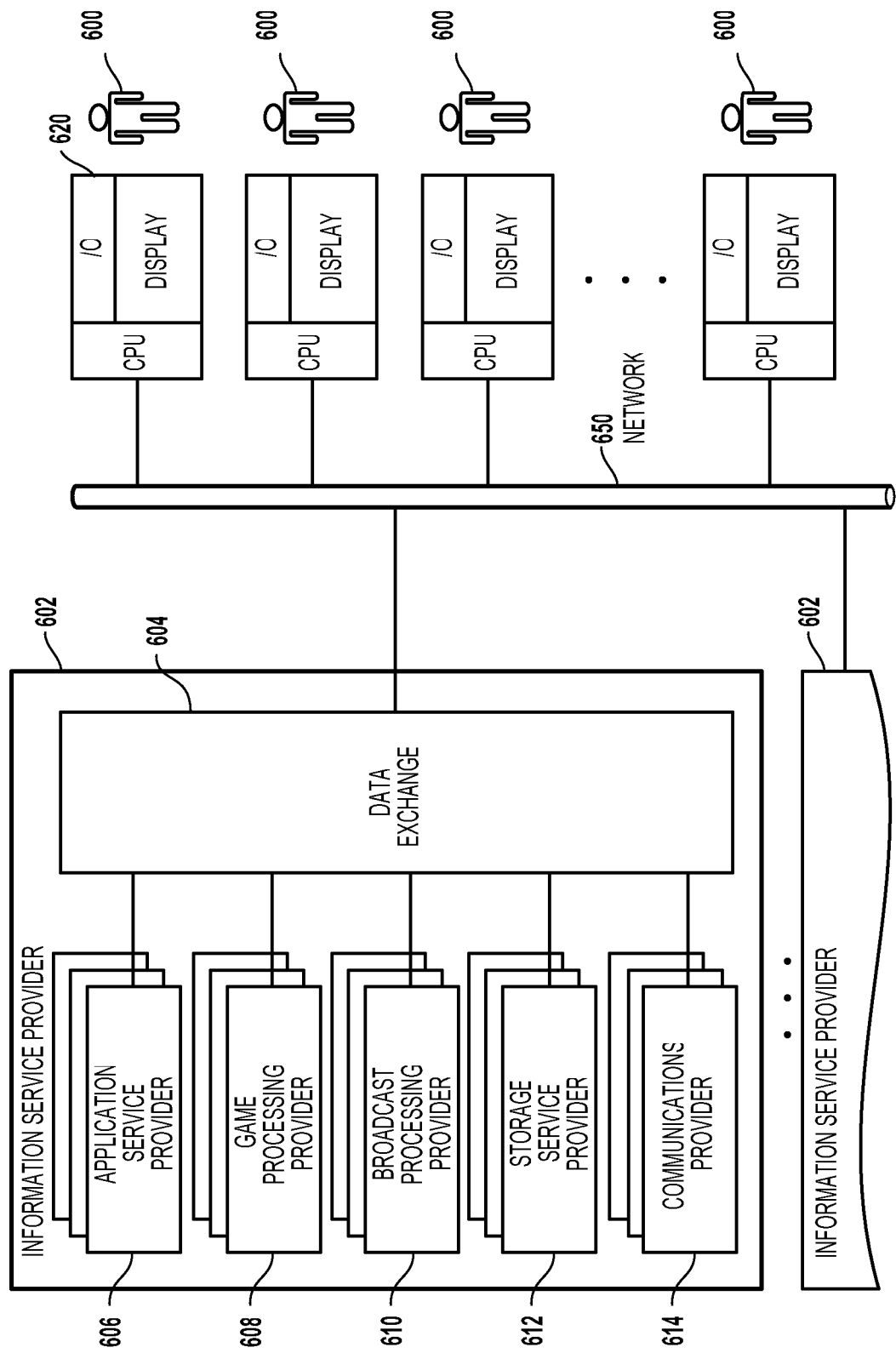
FIG. 6 illustrates an example implementation of an Information Service Provider architecture, in accordance with one implementation of the present disclosure.

FIG. 6 illustrates an embodiment of an Information Service Provider architecture. Information Service Providers (ISP) 602 delivers a multitude of information services to users (i.e., players, spectators) 600 geographically dispersed and connected via network 200. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 602 includes Application Service Provider (ASP) 606, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 602 includes a Game Processing Server (GPS) 608 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 610 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 612 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 614 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 604 interconnects the several modules inside ISP 602 and connects these modules to users 600 via network 650. Data Exchange 604 can cover a small area where all the modules of ISP 602 are in close proximity, or can cover a large geographic area when the different modules are geographically dispersed. For example, Data Exchange 804 can include a fast Gigabit Ethernet (or faster) within a cabinet of a data center, or an intercontinental virtual area network (VLAN).

Users 600 access the remote services with client device 620 (i.e., client device 100 in FIG. 1), which includes at least a CPU, a memory, a display and I/O. The client device can be a PC, a mobile phone, a netbook, tablet, gaming system, a PDA, etc. In one embodiment, ISP 602 recognizes the type of device used by the client and adjusts the communication method employed. In other cases, client devices use a standard communications method, such as html, to access ISP 602.

Figure 7:
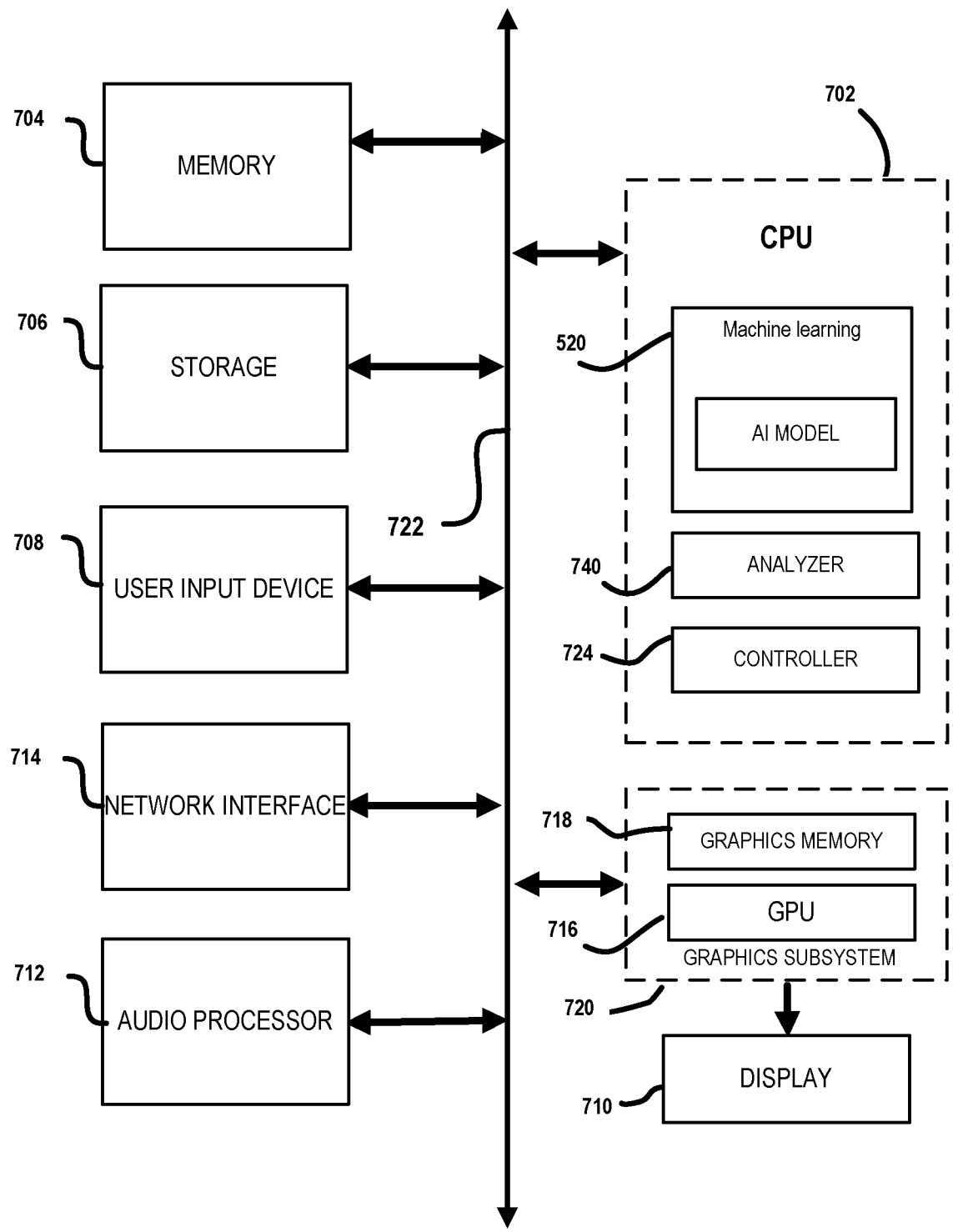
FIG. 7 illustrates a simplified block diagram of a game cloud server used for generating and accessing annotations for a video content stream generated by a producer, in accordance with one implementation of the present disclosure.

FIG. 7 illustrates components of an example computing device 700 that can be used to perform aspects of the various embodiments of the present disclosure. This block diagram illustrates a computing device 700 that can incorporate or can be a personal computer, video game console, personal digital assistant, a server 300 or other digital device, suitable for practicing an embodiment of the disclosure. FIG. 7 illustrates an exemplary computing device 700 with hardware components suitable for training an AI model that is capable of performing various functionalities in relation to a video game and/or game plays of the video game, in accordance with one embodiment of the present disclosure. Computing device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores.

Further embodiments can be implemented using one or more CPUs 702 with microprocessor architectures specifically adapted for highly parallel and computationally intensive applications, such as processing operations of interpreting a query, identifying contextually relevant resources, implementing and rendering the contextually relevant resources in a video game immediately, media and interactive entertainment applications, applications configured for deep learning, content classification, and user classifications. For example, CPU 702 may be configured to include a machine learning algorithm 520 (which includes an AI engine or deep learning engine) that is configured to support and/or perform learning operations with regards to providing various functionalities (e.g., predicting, suggesting) in relation to interactive applications (e.g., a video game (game play of the video game), streaming content applications, etc.). Further, the CPU 702 includes an analyzer 740 that is configured for analyzing the inputs and interactions and providing the results of the analysis for generating and training the machine learning model (AI model). The trained AI model provides an output in response to selection of particular set of annotation options, wherein the output is dependent on the predefined functionality of the trained AI model. The trained AI model may be used to identify an optimal set of annotation layers for dynamically overlaying over video content stream to generate the annotated video content stream for viewing. The annotated video content stream provides content enhancement that provide enriching viewing experience for spectators.

Computing device 700 may be localized to a player playing a game segment (e.g., game console), or remote from the player (e.g., back-end server processor), or one of many servers using virtualization in a game cloud system for remote streaming of gameplay to client devices (or simply referred to as "clients").

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to computing device 700, examples of which may include keyboards, mice, joysticks, touch pads, touch screens, handheld controllers, wearable controllers, still or video recorders/cameras, tracking devices for recognizing gestures, and/or microphones. Network interface 714 allows computing device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of computing device 700, including CPU 702, memory 704, storage 706, user input devices 708, network interface 714, and audio processor 712 are connected via one or more data buses 722.

A graphics subsystem 720 is further connected with data bus 722 and the components of the computing device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes three-dimensional (3D) rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 720 periodically outputs pixel data for an image from graphics memory 718 to be displayed on display device 710. Display device 710 can be any device capable of displaying visual information in response to a signal from the device 700, including CRT, LCD, plasma, and OLED displays. Computing device 700 can provide the display device 710 with an analog or digital signal, for example.

It is to be noted, that access services, such as providing access to games or interactive applications of the current embodiments, delivered over a wide geographical area often use cloud computing. Cloud computing is a style of computing in which dynamically scalable and often virtualized resources are provided as a service over the Internet. Users do not need to be an expert in the technology infrastructure of the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server (e.g., cloud server 300) may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of PEs, each of which may reside on different server units of a data center.

According to this embodiment, the respective PEs for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a PE associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Users access the remote services with client devices, which include at least a CPU, a display and I/O. The client device can be a PC, a mobile phone, a netbook, a PDA, a mobile device, etc. In one embodiment, the network executing on the game server recognizes the type of client device used by a user and adjusts the communication method employed. In other cases, client devices use a standard communications method, such as html, to access the application on the game server over the internet.

It should be appreciated that a given video game or gaming application may be developed for a specific platform and a specific associated controller device (or simply referred to as "controller") 724. However, when such a game is made available via a game cloud system as presented herein, the user (e.g., player) may be accessing the video game with a different controller 724. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller 724 (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller 724 are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller 724. That is, the controller 724 communicates via a wireless or wired connection with the client device to transmit inputs from the controller 724 to the client device. The client device may in turn process these inputs and then transmit input data to the game cloud server via a network (e.g. accessed via a local networking device such as a router). However, in other embodiments, the controller can itself be a networked device, with the ability to communicate inputs directly via the network to the game cloud server, without being required to communicate such inputs through the client device first. For example, the controller might connect to a local networking device (such as the aforementioned router) to send to and receive data from the game cloud server. Thus, while the client device may still be required to receive video output from the cloud-based video game and render it on a local display, input latency can be reduced by allowing the controller to send inputs directly over the network to the game cloud server, bypassing the client device.

In one embodiment, a networked controller and client device can be configured to send certain types of inputs directly from the controller to the game cloud server, and other types of inputs via the client device. For example, inputs whose detection does not depend on any additional hardware or processing apart from the controller itself can be sent directly from the controller to the game cloud server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the game cloud server. These might include captured video or audio from the game environment that may be processed by the client device before sending to the game cloud server. Additionally, inputs from motion detection hardware of the controller might be processed by the client device in conjunction with captured video to detect the position and motion of the controller, which would subsequently be communicated by the client device to the game cloud server. It should be appreciated that the controller 724 in accordance with various embodiments may also receive data (e.g. feedback data) from the client device or directly from the game cloud server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

The invention claimed is:

1. A method for generating social posts for users watching media content, comprising:
   identifying the users viewing the media content as a group including a first user;
   receiving inputs provided by at least one second user in the group viewing the media content;
   predicting a mood of a first user in the group at a time when a portion of the media content is displaying at a client device of the first user, the predicting based on context associated with the portion of the media content and the inputs received in a comment box rendered alongside the media content, the inputs received from the at least one second user in the group leading up to the time of displaying of the portion of the media content; and
   automatically generating, without any current input from the first user, a social post for the first user based on the context associated with the portion of the media content and the predicted mood of the first user, the social post generated in accordance to an interaction style of the first user determined by analyzing social interactions generated by the first user over time, the social post forwarded in a social post user interface to the client device of the first user for displaying to allow the first user to verify the social post prior to the social post being posted in the comment box as an input originating from the first user, wherein, the social post user interface includes one or more options, which when activated, allows the first user to perform edits to the social post prior to posting in the comment box shared with other users in the group, wherein the comment box and the social post user interface are different from social media user interface of a social media application,
   wherein operations of the method are performed by a social posting engine executing on a processor of a computing device.

2. The method of claim 1, wherein access to the social post user interface for presenting the social post generated by the social posting engine is provided to the first user for verification prior to posting to the comment box that is accessible by other users in the group,
   wherein the comment box includes the inputs provided by the one or more users and the social post generated by the social posting engine and approved by the first user for sharing with the other users of the group.

3. The method of claim 1, wherein the one or more options includes an edit option selectable by the first user for editing the suggested social post prior to posting the suggested social post to the comment box, wherein the edit option allows altering language, adding or deleting select content in the suggested social post.

4. The method of claim 1, wherein the one or more options includes a post option selectable by the first user for posting the suggested social post to a social media account of the first user as originating from the first user.

5. The method of claim 1, further includes forwarding the social post to the client device of the first user as an auto social post for automatically posting in a social media account of the first user, the auto social post generated in accordance to posting preference set by the first user or posting preference determined from the social interactions of the first user.

6. The method of claim 1, wherein the inputs provided in the comment box by one or more of the users in the group are related to the media content, or are related to inputs provided by one or more other users in the group, or are inputs directed toward one or more of other users.

7. The method of claim 1, wherein predicting the mood of the first user includes,
   parsing the inputs received from the one or more users of the group to identify input features, the input features of the inputs used to identify context of the inputs; and
   classifying the inputs based on the input features identified from the inputs.

8. The method of claim 7, wherein predicting the mood further includes,
   creating an artificial intelligence (AI) model with a plurality of nodes and edges, wherein each node of the plurality of nodes includes one or more of the input features and classification of the inputs and each edge defined between a pair of consecutive nodes corresponds to relationship between the input features and classification included in respective pair of consecutive nodes,
   wherein the AI model is trained using additional inputs received from the one or more users in the group, the additional inputs received correspond with changes occurring in the content and context of the media content over time.

9. The method of claim 8, wherein predicting the mood of the first user further includes,
   parsing the portion of the media content to identify state data of the media content currently displaying;
   identifying contextual attributes of the media content based on the state data of the media content;
   classifying the contextual attributes to identify context of the media content; and
   training the AI model using the context of the media content, the context of the media content changing with changes detected in the state data as the media content progresses over time.

10. The method of claim 1, wherein the inputs provided by the one or more users of the group includes inputs from the first user.

11. The method of claim 1, wherein the media content is streaming content provided by an interactive application executing on a cloud server or by another user, or is a streaming pre-recorded media content provided by a content provider or by another user.

12. The method of claim 1, wherein the inputs provided by the one or more users in the group correspond to reaction of the respective user to the portion of the media content currently displaying or reaction to input provided by another user in the group, and wherein the inputs include text comments, audio comments, hashtags with comments related to the hashtags, audio content, image of the user captured using an image capturing device associated with a client device of the user, thumbs-up, thumbs-down, applause, memes, graphical interchange format files (GIFs), emoticons, emojis, or any two or more combinations thereof, wherein the one or more users providing the inputs includes the first user.

13. The method of claim 1, wherein the interaction style of the first user is updated to a user profile of the first user as posting preferences of the first user.

14. The method of claim 1, wherein the social post generated for the first user includes an image of the first user, or an icon or an avatar representing the first user.

15. A system for generating social posts for users watching media content, comprising:

a social posting engine configured to, identify the users viewing the media content as a group including a first user;

receive inputs provided by at least one second user in the group viewing the media content;

predict a mood of a first user in the group at a time when a portion of the media content is displaying at corresponding client devices of the one or more users, wherein the mood is predicted based on context associated with the portion of the media content displaying at the time and the inputs received in a comment box rendered alongside the media content, the inputs received from the at least one second user in the group leading up to the time of displaying of the portion of the media content; and automatically generate, without any current input from the first user, a social post for the first user based on the context associated with the portion of the media content and the mood predicted for the first user, the social post generated in accordance to an interaction style of the first user determined by analyzing social interactions generated by the first user over time, the social post forwarded in a social post user interface to a client device of the first user for displaying to allow the first user to verify the social post prior to the social post being posted in the comment box as an input originating from the first user, wherein the social post user interface includes one or more options, which, when activated, allows the first user to perform edits to the social post prior to posting in the comment box shared with other users in the group, wherein the comment box and the social post user interface are different from a social media user interface of a social media application, wherein the social posting engine is stored in memory and executed by a processor of a computing device.

16. The system of claim 15, wherein the social posting engine is configured to generate the social post for the first user as a suggested social post, the suggested social post forwarded in a social post user interface to the client device of the first user for displaying, the social post user interface including one or more options for the first user to edit the suggested social post and to post the suggested social post in the comment box rendered alongside the media content and shared with other users in the group.

17. The system of claim 15, wherein the social posting engine is further configured to generate the social post for the first user as an auto social post, the auto social post transmitted to the client device of the first user for automatically posting to a social media account of the first user, and wherein the interaction style of the first user is updated to a user profile of the first user as posting preferences of the first user.

18. The system of claim 17, wherein the auto social post includes one or more hashtags and content related to the media content or content related to the one or more users of the group.

\* \* \* \* \*